United States Patent
Miller

(10) Patent No.: US 6,531,799 B1
(45) Date of Patent: *Mar. 11, 2003

(54) HYBRID ELECTRIC MACHINE WITH TWO ROTORS, PERMANENT MAGNET POLES AND CONTROLLABLE FIELD CURRENT

(75) Inventor: John Michael Miller, Saline, MI (US)

(73) Assignee: Ford Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/467,463

(22) Filed: Dec. 20, 1999

(51) Int. Cl.[7] .................. H02K 16/00; H02K 6/02; H02K 47/00; H02K 19/38; H02K 21/12; H02K 19/26; H02K 1/22

(52) U.S. Cl. .................. 310/114; 310/112; 310/181; 310/268; 310/156.53; 310/156.43; 310/156.49; 310/156.48

(58) Field of Search .................. 310/114, 112, 310/198, 181, 268, 121, 64, 261, 266, 156.06, 156.15, 156.34, 156.37, 156.48, 156.54, 156.61, 156.64

(56) References Cited

U.S. PATENT DOCUMENTS

| | | | |
|---|---|---|---|
| 3,411,027 A | | 11/1968 | Rosenberg |
| 3,579,277 A | * | 5/1971 | Imahashi ............... 310/156.05 |
| 3,831,071 A | * | 8/1974 | Mitsui .................... 310/156.37 |
| 3,845,339 A | * | 10/1974 | Merkle et al. ......... 310/156.34 |
| 3,889,141 A | * | 6/1975 | Merriam ...................... 310/154 |
| 4,100,444 A | * | 7/1978 | Boyd, Jr. .................... 310/184 |
| 4,348,606 A | * | 9/1982 | Hibino ....................... 310/184 |
| 4,631,435 A | * | 12/1986 | McCarty |
| 4,654,551 A | | 3/1987 | Farr |
| 4,656,379 A | * | 4/1987 | McCarty ..................... 310/181 |
| 4,763,034 A | * | 8/1988 | Gamble ....................... 310/181 |
| 4,777,397 A | | 10/1988 | Parshall |
| 4,823,037 A | * | 4/1989 | Abukawa et al. ....... 310/154.22 |
| 5,117,141 A | * | 5/1992 | Hawsey et al. ............. 310/114 |
| 5,177,391 A | * | 1/1993 | Kusase ........................ 310/263 |
| 5,212,418 A | * | 5/1993 | Mason ........................ 310/114 |
| 5,334,899 A | * | 8/1994 | Skybyk ....................... 310/114 |
| 5,410,201 A | * | 4/1995 | Tanaka et al. ................ 310/68 |
| 5,440,185 A | * | 8/1995 | Allwine, Jr. ................ 310/114 |
| 5,442,956 A | * | 8/1995 | Persson ..................... 73/118.1 |
| 5,631,512 A | * | 5/1997 | Kawabata et al. .......... 310/156 |
| 5,793,136 A | * | 8/1998 | Redzic ........................ 310/114 |
| 5,886,450 A | * | 3/1999 | Kuehnle ..................... 310/261 |
| 5,917,248 A | * | 6/1999 | Seguchi et al. ............... 290/31 |
| 5,973,436 A | * | 10/1999 | Mitcham .................... 310/266 |
| 5,982,058 A | * | 11/1999 | Bustamante et al. ... 310/156.37 |
| 6,005,317 A | * | 12/1999 | Lamb .......................... 310/103 |
| 6,037,692 A | * | 3/2000 | Miekka et al. .............. 310/181 |
| 6,131,709 A | * | 10/2000 | Jolly et al. ................ 188/267.2 |
| 6,163,097 A | * | 12/2000 | Smith et al. ................. 310/254 |
| 6,232,690 B1 | * | 5/2001 | Schmider .................... 310/112 |

OTHER PUBLICATIONS

IEEE Transactions on Magnetics, vol. 28, No. 5, Sep. 1992, Double Disc Alternators with Hybrid Excitation.

* cited by examiner

*Primary Examiner*—Thomas M. Dougherty
*Assistant Examiner*—Julio Gonzalez Ramirez

(57) ABSTRACT

An electric machine or assembly 10 including a housing 12, a stationary stator 14, two substantially identical and opposed rotors 16, 18, and a pair stationary field coils 22, 24. Field coils 22, 24 are selectively energizable to controllably vary the flux generated by assembly 10, thereby allowing assembly 10 to provide a relatively constant output torque, power, or voltage over a relatively wide range of operating speeds.

16 Claims, 4 Drawing Sheets

HYBRID ELECTRIC MACHINE WITH TWO ROTORS, PERMANENT MAGNET POLES AND CONTROLLABLE FIELD CURRENT

FIELD OF THE INVENTION

This invention relates to an electric machine, and more particularly, to a hybrid electric machine including a pair of rotors and a single toroidally wound stator, and which generates flux by way of a plurality of permanent magnet poles, a plurality of consequent poles, and a selectively controllable field current.

BACKGROUND OF THE INVENTION

Electric machines such as generators and motors generally utilize a plurality of rotating magnets and/or rotating magnetic members in order to generate electrical power and/or torque.

One common type of electric machine, known as an electromagnetic motor or generator, generally includes a rotor having a plurality of pole fingers in the form of north and south ferromagnetic members or consequent poles, and one or more electric "field coils" which are selectively and electrically energized, thereby selectively producing a flux within the rotating members of the rotor. In these types of electromagnetic machines, electric power is supplied to the rotating field coils by way of one or more brushes, slip rings, and/or other devices. The output of these electromagnetic machines (e.g., the output torque, power, or voltage) can be relatively easily controlled by controlling the amount of current supplied to the "field coils". In this manner, these types of electric machines can provide a relatively constant output voltage, torque, or power over a relatively wide range of operating speeds and temperatures. While these electromagnetic machines are effective to generate a relatively constant output torque, power, or voltage, they suffer frog some drawbacks.

For example and without limitation, the brushes, slip rings, and/or other devices, which are required within these machines to provide an electrical connection to the rotating field coils, add to the cost, complexity, and size of the machines, and undesirably wear over time, thereby resulting in diminished performance and/or failure of the machine.

A second type of electric machine, known as a permanent magnet motor or generator, generally includes a rotor having a plurality of permanent magnets which selectively produce a flux within the machine. Due to the permanent magnets within the rotor, these types of machines do not require field coils to produce magnetic flux. Therefore, these systems do not require the brushes, slip rings and other devices which are necessary in the previously described electromagnetic machines. As such, these permanent magnet machines are typically smaller, less complex, more efficient, and less costly than the previously described electromagnetic machines. These permanent magnet machines do, however, suffer from some other drawbacks.

Namely, because the flux in these electric machines is provided by permanent magnets, it remains substantially constant and is relatively difficult to temporarily alter or vary by use of electric field coils. Thus, the output of these machines (e.g., the output torque, power or voltage) is almost solely and completely dependent upon the operating speed of the machine. As such, these machines provide a relatively constant output voltage, torque, or power only over a relatively narrow and limited range of operating speeds, and therefore cannot be utilized in applications where the operating speed is provided by a relatively "variable" or fluctuating source, such as the engine of a vehicle.

Attempts have been made to provide electric machines which generate flux through permanent magnets and "soft" magnetic members. For example and without limitation, one such type of electric machine includes a pair of stator assemblies, a disc-shaped rotor having a plurality of permanent magnets and soft magnetic portions, members or consequent poles, and a stationary field coil which is used to selectively vary the flux generated by the consequent poles, thereby desirably controlling and/or maintaining the output torque, power, or voltage at a desired magnitude over a relatively wide range of operating speeds. While this type of electric machine is effective to provide a controllable and relatively constant output power and/or voltage, it employs two separate stator assemblies each comprising a separate and independent winding. These separate windings require a relatively significant and costly amount of copper wire and are independently controlled, thereby undesirably increasing the cost and complexity of the machine.

There is therefore a need for a new and improved electric machine which overcomes many, if not all, of the previously delineated drawbacks of such prior electric machines.

SUMMARY OF THE INVENTION

It is a first object of the invention to provide an electric machine which overcomes at least some of the .previously delineated drawbacks of prior electric machines.

It is a second object of the invention to provide an electric machine which provides a relatively constant output power and/or voltage over a relatively wide range of operating speeds.

It is a third object of the invention to provide an electric machine having a torque, power, and/or voltage output which may be substantially and selectively controlled by a way of one or more stationary field coils, and which employs a single stator assembly.

It is a fourth object of the invention to provide an electric machine having a pair of rotors which each include a plurality of permanent magnets and consequent poles.

According to a first aspect of the present invention, an electric machine is provided and includes a pair of rotors which are rotatably disposed upon a shaft. Each of the rotors has a plurality of permanent magnets which collectively generate a first magnetic flux and a plurality of consequent poles which collectively generate a second magnetic flux. A stator assembly is fixedly disposed between the rotors, and has a winding and a core. The electric machine further includes at least one coil which is fixedly disposed in relative close proximity to the rotors and which is selectively energizable, the energization being effective to controllably vary the second magnetic flux.

According to a second aspect of the present invention, a method for providing an electric machine having a controllable output voltage is provided. The method includes the steps of providing a housing; providing a pair of rotors having a plurality of permanent magnets which provide a first magnetic flux and a plurality of consequent poles which provide a second magnetic flux; rotatably disposing the rotors within the housing; providing a stator having winding; disposing the stator between the pair of rotors; fixedly coupling the stator to the housing; providing at least one field coil; fixedly disposing the at least one field coil in relatively close proximity to the rotor; selectively rotating the pair of rotors effective to produce an output voltage having a magnitude within the winding; and selectively energizing the at least one field coil, effective to vary the second magnetic flux, thereby controlling the magnitude of the output voltage.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
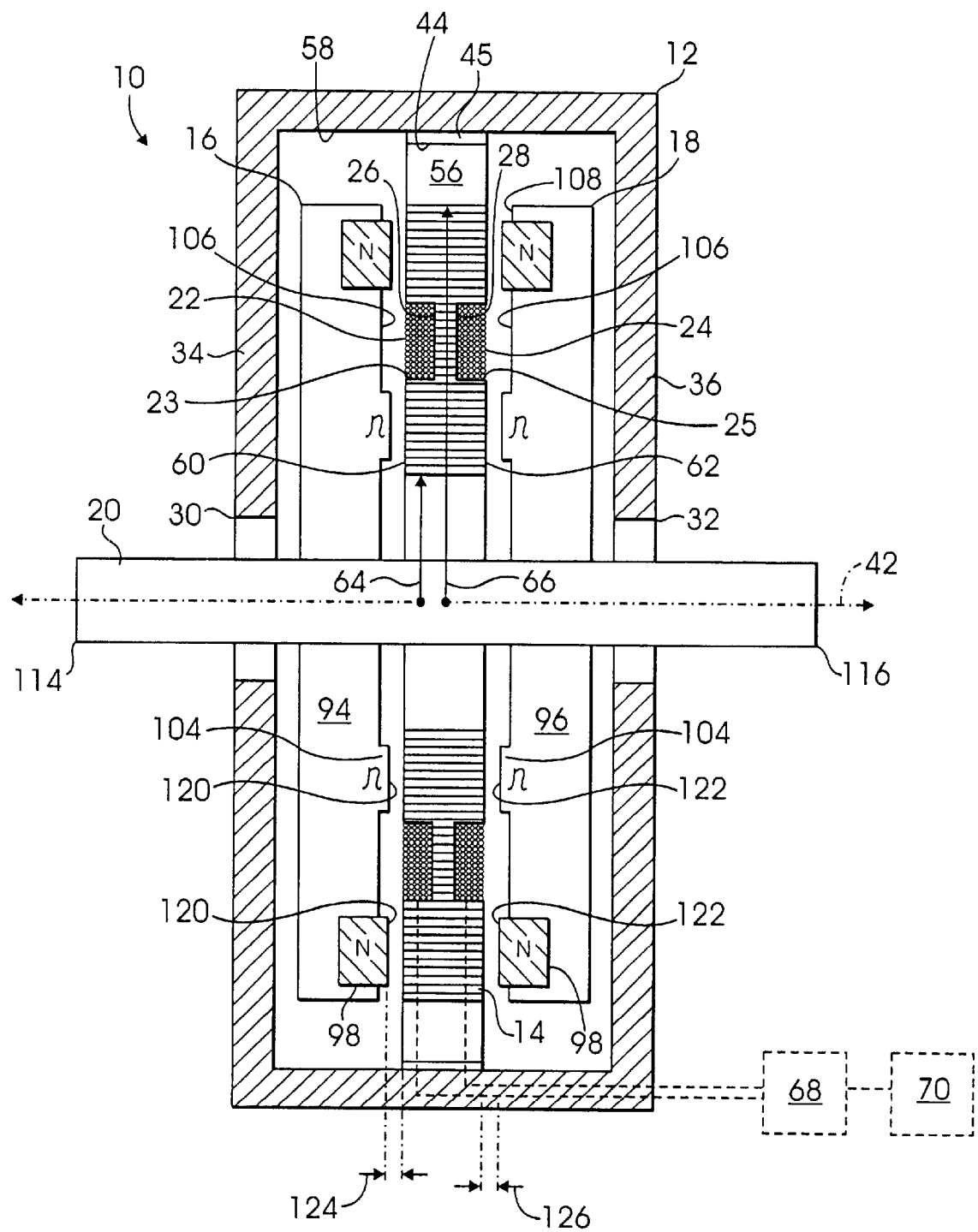
FIG. 1 is a sectional view of an electric machine which is made in accordance with the teachings of the preferred embodiment of the invention.

Referring now to FIGS. 1–4, there is shown an electric machine or assembly 10 made in accordance with the teachings of the preferred embodiment of the invention. As shown, assembly 10 includes a generally cylindrical housing or member 12, a stationary stator member or assembly 14, two substantially identical and opposed rotors or members 16, 18, and a pair stationary field coils 22, 24. Rotors 16, 18 are each coupled to a rotatable shaft 20; stator assembly 14 is fixedly coupled to housing 12 and is disposed in relative close proximity to and between rotors 16, 18; and stationary field coils 22, 24 are fixedly mounted and/or reside within channels 26, 28 which are integrally formed within stator assembly 14. As described more fully and completely below, field coils 22, 24 are selectively energizable to controllably vary the flux generated by assembly 10, thereby allowing assembly 10 to provide a relatively consistent output torque, power, and/or voltage over a relatively wide range of operating speeds.

In the preferred embodiment of the invention, member 12 is manufactured from a relatively strong and durable material such as aluminum. Member 12 includes a pair of substantially identical apertures 30, 32 which are respectively and integrally formed within sides 34, 36 of member 12. A pair of conventional bushing or bearing members 38, 40 are respectively and operatively housed within apertures 30, 32, and rotatably engage shaft 20, and allow shaft 20 to rotate about the longitudinal axis 42 of shaft 20 while concomitantly and substantially maintaining the position of axis 42 within apertures 30, 32. A mounting ring 44 is fixedly and circumferentially coupled to the inner surface 58 of housing 12. Ring 44 includes a channel 45 through which an amount of conventional and commercially available coolant flows or may be channeled, thereby allowing stator assembly 14 to be cooled. In one non-limiting embodiment, housing 12 comprises a three-piece assembly which is adapted to be fixedly and operatively mounted to the engine block of a vehicle.

Figure 2:
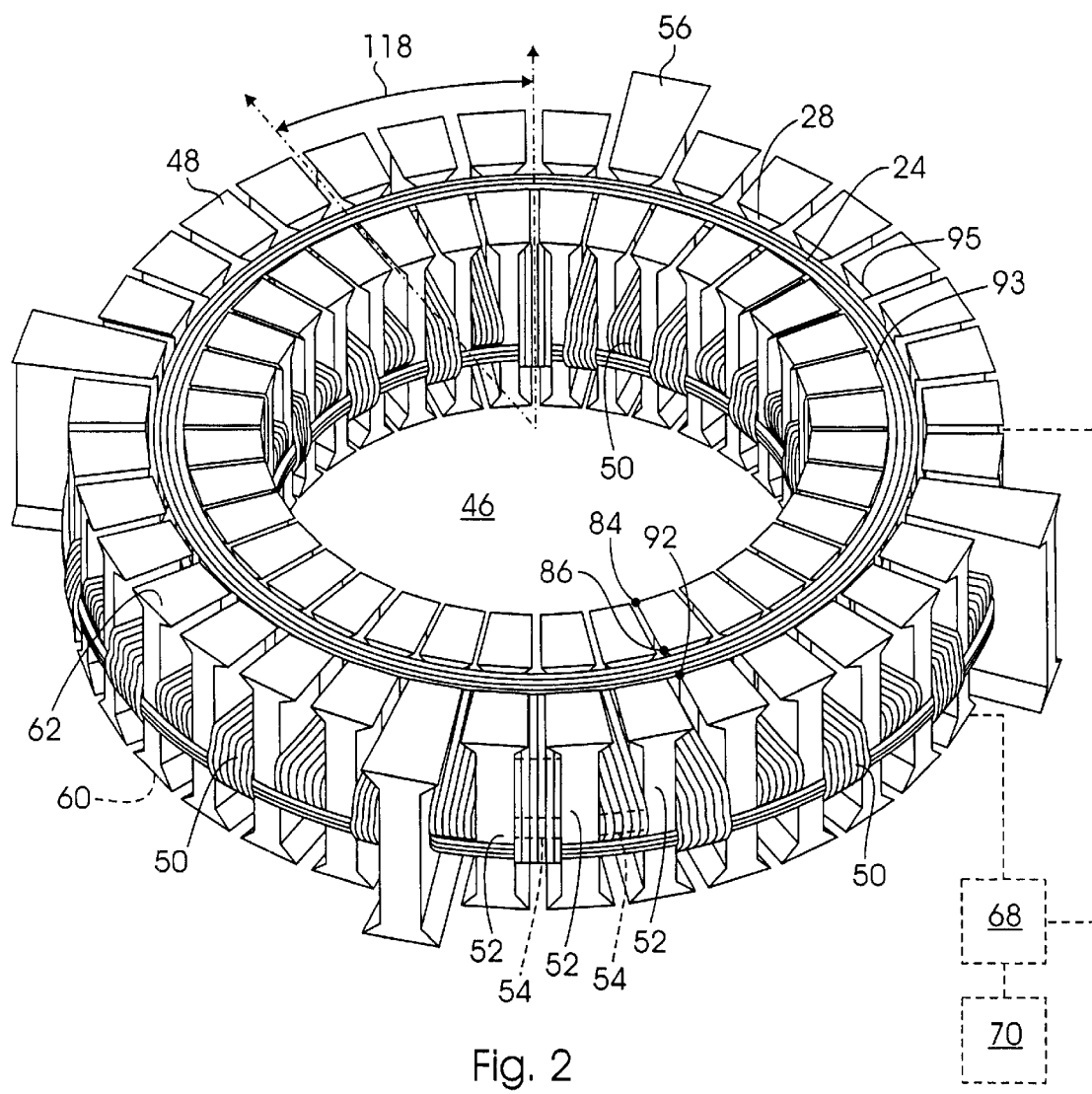
FIG. 2 is a perspective view of the stator assembly employed within the electric machine shown in FIG. 1.
Figure 3:
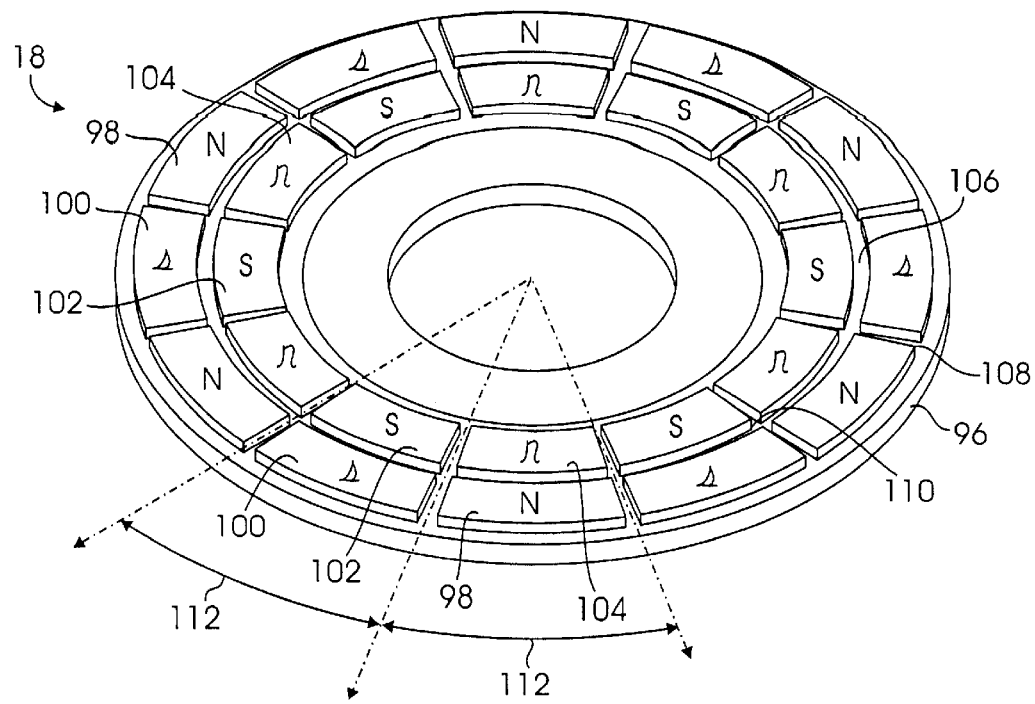
FIG. 3 is perspective view of one of the rotors employed within the electric machine shown in FIG. 1.

As best shown in FIG. 2, stator assembly 14 includes a generally "ring" shaped core portion 48 having a centrally disposed aperture 46, and a conventional stator coil or winding 50, which may comprise a conventional polyphase winding. Core portion 48 includes a plurality of substantially similar raised "pole" portions 52, which are each separated by a substantially identical recessed or "slot-forming" portion 54. In the preferred embodiment of the invention, core portion 48 includes thirty-six raised portions 52 and thirty-six recessed portions 54. In other alternate embodiments, stator assembly 14 includes different numbers or quantities of "pole" portions 52 and corresponding different numbers or quantities of recessed or "slot-forming" portions 54.

In the preferred embodiment of the invention, four of the pole portions 52 include projecting or radially extending portions 56, which are collectively and cooperatively used to fixedly mount stator assembly 14 within housing 12. Particularly, portions 56 are each conventionally and fixedly coupled to mounting ring 44, which is conventionally and fixedly coupled to the inside surface 58 of housing 12. In other alternate embodiments, different numbers or quantities of radially extending portions 56 may be used.

Channels 26, 28 are generally circular and integrally formed within core 48. Particularly, channels 26, 28 are each respectively formed within the opposed surfaces 60, 62 of core 48 and are respectively and axially "aligned" with each other.

Winding 50 is "toroidally" wound around and/or within core 48. Particularly, winding 50 is wrapped or coiled multiple times around each recessed portion 54. In the preferred embodiment of the invention, winding 50 is a conventional "three phase" winding and includes three mutually independent windings which give rise to a conventional "three-phase" alternating current. In this non-limiting and preferred embodiment, each mutually independent winding is wrapped or wound multiple times around every third recessed portion 54 (e.g., each recessed portion 54 is "wrapped" or coiled with one of the three mutually independent windings). The "orientation" or direction in which winding 50 is "wrapped" or wound around portions 54 (i.e., clockwise or counter-clockwise) alternates for each consecutive or adjacent recessed portion 54 (e.g., each clockwise "wrapping" is followed by or adjacent to a counter-clockwise "wrapping" and each counter-clockwise "wrapping" is followed by or adjacent to a clockwise "wrapping"). Winding 50 is electrically, physically, and communicatively coupled to a switching and/or controller assembly 68 which may include a microprocessor/controller and a plurality of electrical and/or electromechanical switching and frequency converting components or devices, such as and without limitation transistors, diodes, relays, transformers, and other electrical components. Controller assembly 68 is electrically coupled to a conventional power supply or battery 70.

Figure 5:
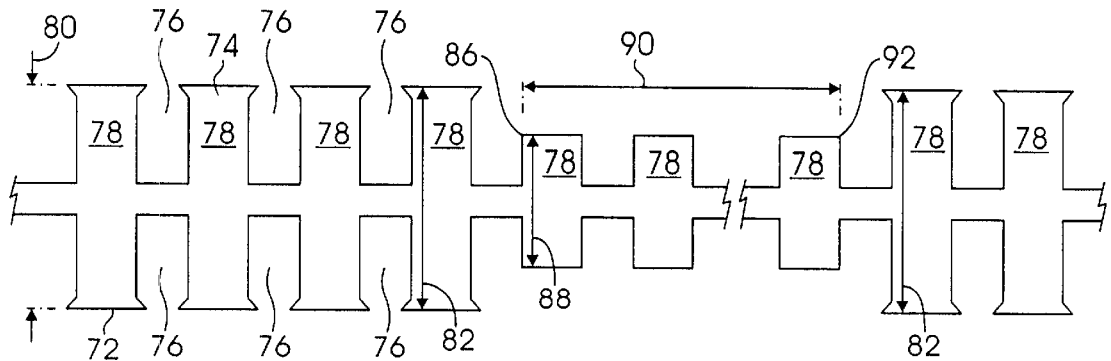
FIG. 5 is a partial side view of an amount of metallic "tape" which is used to make a stator assembly used within the electric machine shown in FIG. 1.

As best shown in FIGS. 2 and 5, in the preferred embodiment of the invention, stator core 48, is manufactured from a magnetic tape or "band" member 72, such as steel tape, which is laminated with an insulating material 74. Core 48 is spirally wound or "coiled" from initial or inner radius 64 to an exterior or outer radius 66. Member 72 is preferably made of a soft magnetic or ferromagnetic material and is coated with a relatively thin layer of insulating material 74, such as an oxide or an organic film. Member 72 includes a plurality of substantially identical recessed portions or "notches" 76, which are disposed on opposing sides of member 72 and which collectively and cooperatively form recessed portions 54 when core 48 is wound. In the preferred embodiment of the invention, notches 76 are cut, punched, or otherwise formed into member 72 in a conventional manner. Each pair of opposing notches 76 are separated by a raised or generally "I"-shaped member or portion 78. Portions 78 collectively and cooperatively form raised portions 52 when core 48 is wound. Portions 78 have a height 80 which varies over the length of member 72.

Particularly, height 80 is substantially equal to distance 82 from point 84 of core 48 or member 72, to point 86 of core 48 or member 72 (e.g., where channels 26, 28 collectively "begin" or originate). The height 80 of members 78 is reduced to distance 88, which is relatively less than distance 82, from point 86 to point 92, thereby compensating for and/or forming channels 26, 28 when core 48 is wound. After point 92, height 80 is again substantially equal to distance 82. Thus, by reducing the height 80 over length 90, member 72 will substantially conform to the desired structure of core 48, as illustrated in FIG. 2, when core 48 is spirally wound or "wrapped". In one non-limiting embodiment, the length 90 between points 86 and 92 is calculated in a conventional manner using values of the inner circumference 93 of channels 26, 28, the outer circumference 95 of channels 26, 28, and the "thickness" of member 72.

It should be appreciated that the pre-formed notches 76 and the individually laminated "coils" or wraps of member 72 cooperatively and substantially reduce the amount of "iron losses" within core 48. Particularly, if the channels 26, 28 and recessed portions 54 were cut, punched, or formed into core 48 after the core was wound, the cutting and/or forming process would undesirably "short" the individual layers or windings of core 48 or member 72 together, thereby undesirably producing current losses within the core 48. Thus, by pre-forming or "punching" notches 76 prior to "winding" core 48, these losses are reduced and/or substantially eliminated.

Rotors 16, 18 are substantially identical in structure and function and are manufactured from a ferromagnetic material, such as iron or steel. Each rotor 14, 16 respectively include a generally disk shaped core or member 94, 96 which is collectively and conventionally coupled to rotor shaft 20. Each core or member 94, 96 respectively includes an "outer ring" or plurality of peripherally disposed permanent magnets or poles 98 and soft magnetic projections, raised portions, or consequent poles 100, which are disposed in an alternating arrangement with magnets 98. Each core or member 94, 96 further includes an "inner ring" or plurality of permanent magnets or poles 102 and soft magnetic projections, raised portions, or consequent poles 104, which are disposed in an alternating arrangement with poles 102.

Permanent magnets 98, 102 are preferably, respectively, and conventionally set and/or secured within slots 108, 110, which are integrally formed within cores 94, 96.

As best shown in FIG. 1, the magnetic charge or orientation of magnets 98, 102 of rotor 16 is the same as the magnetic charge or orientation of magnets 98, 102 of rotor 18, with which they are axially aligned. Raised portions or consequent poles 100, 104, are preferably and integrally formed within cores 94, 96, and are capable of being temporarily magnetized in the presence of a field current. Poles 102, 104 are each respectively separated from poles 100, 98 by a thin strip or portion 106 of respective cores 94, 96.

In the preferred embodiment, poles 98, 100 are substantially similarly sized and shaped, and are generally semi-circular or "wedge-shaped". Poles 102, 104 are shaped similar to poles 98, 100, but are smaller in size. Each pair of inner/outer poles 104, 98 and 102, 100 respectively resides substantially within the same angular portion, region, or "pitch" 112 of cores 94, 96.

The outer surfaces 120 of poles 98–104 of rotor 16 are separated from surface 60 of stator 14 by a substantially uniform and relatively small distance or air gap 124, which in one non-limiting embodiment is approximately equal to between 0.4 millimeters to 0.6 millimeters. The outer surfaces 122 of poles 98–104 of rotor 14 are separated from surface 62 of stator 14 by a substantially uniform and relatively small distance or air gap 126 which is substantially equal to distance or air gap 124.

While the non-limiting embodiment shown in FIG. 2 illustrates twelve permanent magnets and twelve consequent poles per rotor 16, 18, in other alternate embodiments, other numbers or quantities of permanent magnets and consequent poles are used. Alternate embodiments of rotors 16, 18 having different or additional numbers of permanent magnets will have a corresponding number of consequent poles disposed in an alternating relationship with the permanent magnets (e.g., disposed "between" the permanent magnets). In such alternate embodiments, the number of permanent magnets and consequent poles per rotor 16, 18, will be respectively and substantially proportional to and/or equal to the number of raised or pole portions 52 within stator core 48, and the "pole pitch" 112 of the poles 98–104 will be respectively and substantially proportional to or equal to the "pitch" of raised portions 52. In embodiments utilizing a polyphase winding, the number of raised portions 52 within stator core 48 will preferably be equal to a multiple of the total number of permanent magnets 98, 102 used per rotor 16, 18, and the "pitch" 112 of magnets 98, 102 will be equal to the total pitch of several adjacent raised portions 52. For example and without limitation, in the preferred embodiment of the invention, which utilizes a conventional three-phase winding, the number of raised portions 52 within stator core 48 (i.e., thirty-six) equals three times the number of permanent magnets used per rotor 16, 18 (i.e., twelve). Furthermore, in the preferred embodiment, the pitch 112 of magnets 98, 102 is substantially equal to the total pitch 118 of three adjacent raised portions 52, as illustrated in FIG. 2.

Shaft 20 is generally cylindrical and includes a pair of ends 114, 116 which allow rotors 16, 18 to be selectively and operatively coupled to a pulley, drive belt, or other device which receives torque from and/or provides torque to rotors 16, 18.

Field coils 22, 24 are generally circular in shape and are each respectively mounted on bobbins 23, 25 which are fixedly and respectively secured within channels 26, 28. As best shown in FIG. 1, coils 22, 24 are each substantially and axially "aligned" with portions 106 of rotors 16, 18 and reside axially "between" the "outer" poles 98, 100 and the "inner" poles 102, 104. Field coils 22, 24 are respectively, electrically, physically, and communicatively coupled to switching and/or controller assembly 68 which selectively and operatively sources electrical power from supply 70 to field coils 22, 24 in a conventional manner. In other alternate embodiments, coils 22, 24 are replaced with a single selectively energizable coil which is disposed within, upon, and/or in relative close proximity to stator assembly 14 and/or rotors 16, 18. It should further be appreciated that other numbers or quantities of coils 22, 24 may be employed within assembly 10.

Figure 4:
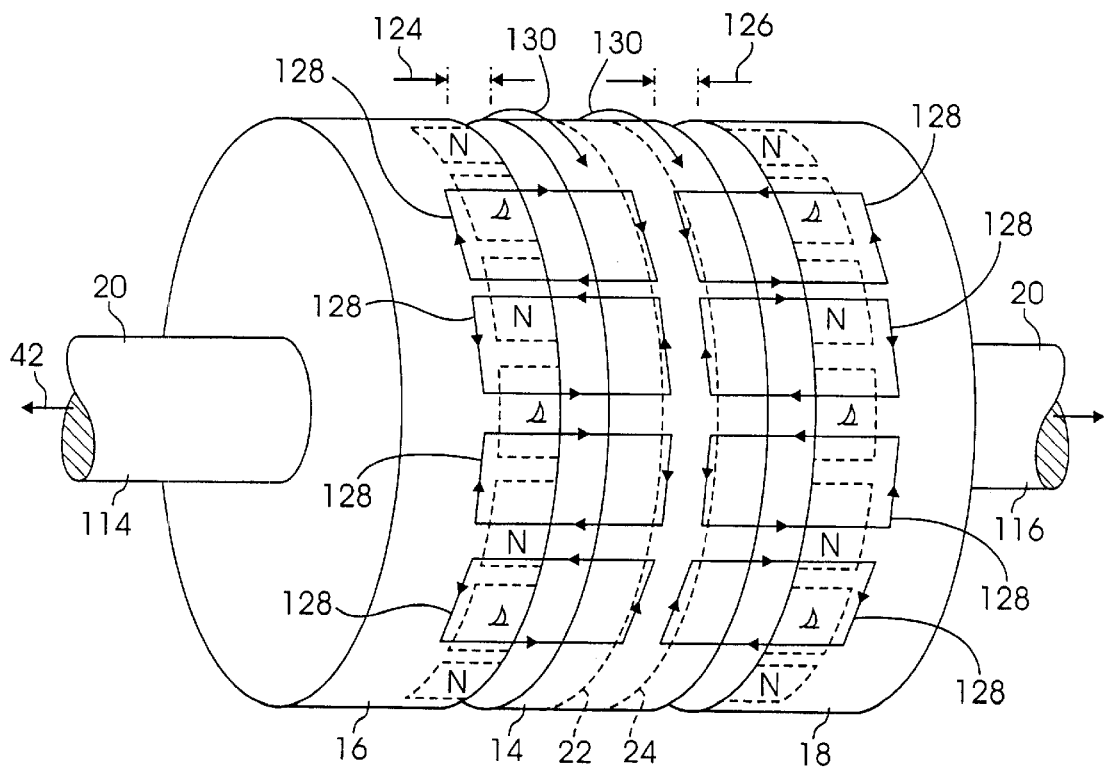
FIG. 4 is a perspective view of the rotors and stator assembly employed within the electric machine shown in FIG. 1 and illustrating the a magnetic field or flux path generated within the electric machine.

In operation, assembly 10 is coupled by way of one or both of ends 114, 116 to a device which provides and/or receives torque to/from shaft 20. For example and without limitation, assembly 10 can be used as a motor to selectively "drive" shaft 20. Particularly, when torque is desired within shaft 20, controller 68 selectively sources or provides power from supply or battery 70 to field coils 22, 24 and/or windings 50 in order to create a varying magnetic field or flux such as fields 128, which are illustrated in FIG. 4, and which cross or traverse gaps 124 and 126 and permeate rotors 16, 18, and stator 14. As should be appreciated by one of ordinary skill in the art, the presence of the varying magnetic flux or fields 128 cause torque to develop between the rotors 16, 18 and stators 14, thereby causing rotors 16, 18 to rotate about axis 42, and providing a rotational force or torque which is selectively transferable to other apparatuses or devices by way of shaft 20. Furthermore, it should be realized that since fields 128 are contained substantially within and between rotors 16, 18 and stator 14, fields 128 have a relatively high "density". Furthermore, since fields 128 do not traverse housing 12 to complete or form their respective "loops", housing 12 is not required to be made of a ferromagnetic material and can be manufactured from virtually any type of material, such as a light weight and durable aluminum or alloy material.

The strength and/or magnitude of the "permanent magnet" induced torque and power varies, based primarily upon the rotational speed of rotors 16, 18. In order maintain the generated torque and/or power at a substantially constant and/or desired magnitude, field coils 22, 24 are selectively activated by way of controller 68. Particularly, if the rotational speed of rotor 18 is less than or greater than the speed required to achieve a desired torque or power, controller 68 selectively activates and/or energizes field coils 22, 24. For example and without limitation, in order to increase the generated output torque, controller 68 sources or provides electrical power from battery or supply 70 to field coils 22, 24, thereby generating a field current within coils 22, 24 in the direction of arrows 130. The generated field current causes the "soft" magnetic portions or consequent poles 100, 104 to act as poles which "strengthen" or enhance the overall flux magnitude of fields 128. By varying the strength and/or magnitude of the field current within coil 22, controller 68 selectively causes consequent poles 100, 104 to selectively provide the necessary additional flux required to maintain a substantially consistent and desired output torque or power.

Figure 6:
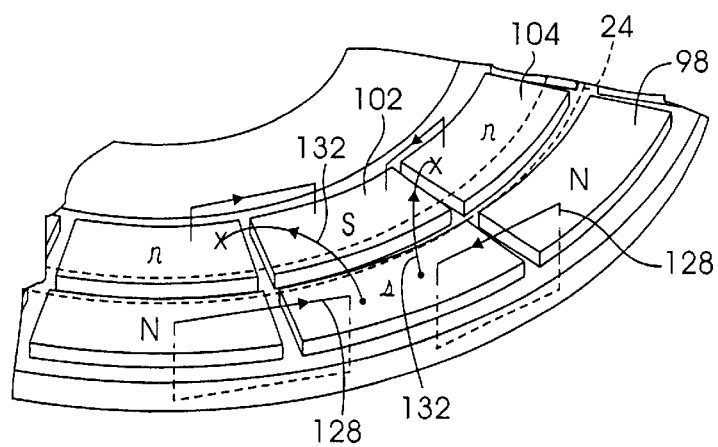
FIG. 6 is a partial view of the rotor shown in FIG. 3 and illustrates a magnetic field generated by the field coil.

When the rotors 16, 18 are rotating at speed or rate which generates a higher than desired output torque or power, controller 68 selectively and controllably sources electrical power through coils 22, 24 in the direction opposite arrows 130, thereby causing portions 100, 104 to act as poles which diminish and/or weaken the strength and/or magnitude of field 128 (e.g. causing consequent poles 100, 104 to generate a magnetic field/flux in the direction opposite field 128), thereby reducing the overall torque or power provided by assembly 10. A non-limiting illustration of this "field-weakening" is shown in FIG. 6. Particularly, the current flowing through coil 24 generates a "weakening" flux or field 132 which alters the "pole character" of consequent poles 100, 104, thereby weakening fields 128.

Assembly 10 may also be used as a "generator" or an "alternator" by coupling shaft 20 to a torque providing device or apparatus, such as a vehicle engine (not shown), by way of one or more pulleys, gears and/or other devices. As torque is provided to shaft 20, rotors 16, 18 begin to rotate about axis 42. As rotors 16, 18 and permanent magnets 98, 102 rotate about axis 42, a varying magnetic field or flux, such as fields 128, is generated which passes through the toroidal windings 50, thereby inducing a voltage and/or current within windings 50.

In order to maintain the induced voltage/current at a substantially constant magnitude, field coils 22, 24 are selectively activated by way of controller 68. Particularly, if the rotational speed of rotors 16, 18 is less than or greater than the speed required to achieve a desired voltage, controller 68 selectively activates and/or energizes field coils 22, 24 as previously described. By varying the strength and/or magnitude of the field current within coils 22, 24 controller 68 selectively causes consequent poles 100, 104 to selectively provide the necessary field "weakening" or "enhancing" flux required to maintain a substantially consistent output voltage or current.

In this manner, assembly 10 selectively and controllably provides and maintains a substantially consistent output torque, power, and/or voltage over a relatively wide range of operational or rotational speeds. Assembly 10 provides this consistent output torque and/or voltage over a relatively wide range of speeds without the use of brushes or slip rings, and with all of the other advantages associated with permanent magnet machines, such as a compact design and a relatively high efficiency. Additionally, assembly 10 provides these advantages while employing only a single stator member, thereby reducing the amount of wire needed, and reducing the cost and complexity of the machine. The use of two rotors 16, 18 disposed on each side of stator 14, provides maximum utilization of the surface area or "working area" of stator 14 and windings 50, thereby providing a substantially and relatively higher flux density than prior hybrid-type electrical machines.

In one non-limiting embodiment, shaft 20 is coupled to the crankshaft of a vehicle engine and used as both a motor (e.g., a starter) and an alternator, or "starter-alternator". By sourcing or providing power from the vehicle battery to winding 50 and/or coils 22, 24, assembly 10 selectively causes the engine to crank, thereby obviating the need for a separate vehicle starter. Particularly, when the vehicle is running (e.g., the engine is in operation), controller 68 can be used to selectively source power from battery 70 to winding 50 and/or coils 22, 24, thereby providing a rotational torque through shaft 20 for turning/cranking the vehicle's engine. When the vehicle is running, the coupling of the crankshaft to shaft 20 provides the input torque and operating speed required to generate electrical power within assembly 10 as described above.

It is understood that the invention is not limited by the exact construction or method illustrated and described above but that various changes and/or modifications may be made without departing from the spirit and/or the scope of the inventions.

What is claimed is:

1. An electric machine comprising:
    a pair of rotors which are rotatably disposed upon a shaft, each of said rotors having a plurality of permanent magnets, which collectively generate a first magnetic flux, and a plurality of soft magnetic portions which act as consequent poles and which collectively generate a second magnetic flux, wherein said plurality of permanent magnets and said plurality of soft magnetic portions are disposed in an alternating arrangement to form an outer ring and an inner ring which are concentric to said shaft, said inner ring being oriented relative to said outer ring whereby each permanent magnet disposed within said inner ring is radially aligned with a unique one of said plurality of soft magnetic portions disposed within said outer ring;
    a stator assembly fixedly disposed between said rotors, and having a winding and a core; and at least one coil, said coil being fixedly disposed in relative close proximity to said pair of rotors, said coil being selectively energizable, said energization being effective to controllably vary said second magnetic flux.

2. The electric machine of claim 1 further including a controller which is operatively coupled to said at least one coil and which is effective to cause said at least one coil to become energized.

3. The electric machine of claim 1 wherein said winding is toroidally wound around said stator assembly.

4. The electric machine of claim 1 wherein said winding comprises a three-phase winding.

5. The electric machine of claim 1 wherein said stator assembly is manufactured from a certain amount of spirally wound ferromagnetic tape.

6. The electric machine of claim 5 wherein said ferromagnetic tape is laminated with an insulating material.

7. The electric machine of claim 1 wherein each of said stator assembly includes a plurality of recessed portions around which said winding is disposed.

8. The electric machine of claim 1 wherein said at least one coil comprises a pair of coils which are fixedly disposed within said stator assembly.

9. The electric machine of claim 1 wherein said rotors are separated from said stator assembly by a distance of 0.4 millimeters to 0.6 millimeters.

10. The electric machine of claim 1 further comprising a housing within which said pair of rotors and said stator assembly are disposed.

11. An electric machine comprising:

a housing;

a stator fixedly disposed within said housing and including a first surface having a first channel, a second surface having a second channel, and a winding;

a first rotor which is rotatably mounted to a shaft and which is disposed in relative close proximity to said first surface, said rotor having a first plurality of permanent magnets and a first plurality of soft magnetic portions which act as consequent poles, wherein said first plurality of permanent magnets and said first plurality of soft magnetic portions are disposed in an alternating arrangement to form a first outer ring and a first inner ring which are concentric to said shaft, said first inner ring being oriented relative to said first outer ring whereby each permanent magnet disposed within said first inner ring is radially aligned with a unique one of said first plurality of soft magnetic portions disposed within said first outer ring;

a second rotor which is rotatably mounted to said shaft and which is disposed in relative close proximity to said second surface, said rotor having a second plurality of permanent magnets which cooperate with said first plurality of permanent magnets to selectively generate a first magnetic flux, and a second plurality of soft magnetic portions which act as consequent poles and which cooperate with said first plurality of soft magnetic portions to selectively generate a second magnetic flux, wherein said second plurality of permanent magnets and said second plurality of soft magnetic portions are disposed in an alternating arrangement to form a second outer ring and a second inner ring which are concentric to said shaft, said second inner ring being oriented relative to said second outer ring whereby each permanent magnet disposed within said second inner ring is radially aligned with a unique one of said second plurality of soft magnetic portions disposed within said second outer ring;

a pair of field coils, each of said pair of field coils being fixedly mounted within a unique one of said first and said second channels; and a controller which is operatively coupled to said pair of field coils and which selectively provides power to said pair of field coils, thereby causing said pair of field coils to selectively vary said second magnetic flux.

12. The electric machine of claim 11 wherein said controller is further operatively coupled to said winding, and selectively provides electrical power to said winding effective to vary said first and said second magnetic flux, thereby causing rotors to rotate and to provide torque to said shaft.

13. The electric machine of claim 11 wherein said shaft is coupled to a selectively rotatable member, said rotation of said member is effective to cause said first and said second rotor to rotate, thereby varying said first and said second magnetic flux and generating electrical current within said winding.

14. The electric machine of claim 11 further comprising a channel disposed around said stator assembly, said channel being adapted to selectively carry an amount of coolant, thereby selectively cooling said stator assembly.

15. The electric machine of claim 11 wherein said winding is toroidally wound around said stator assembly.

16. The electric machine of claim 1 wherein said winding comprises a polyphase winding.

* * * * *